(12) United States Patent
Ni et al.

(10) Patent No.: US 11,317,393 B2
(45) Date of Patent: Apr. 26, 2022

(54) SLOT MONITORING METHOD, INFORMATION TRANSMISSION METHOD, USER EQUIPMENT AND NETWORK DEVICE

(71) Applicants: China Mobile Communication Co., Ltd Research Institute, Beijing (CN); China Mobile Communications Group Co., Ltd., Beijing (CN)

(72) Inventors: Jiqing Ni, Beijing (CN); Wei Zhou, Beijing (CN); Qi Sun, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 123 days.

(21) Appl. No.: 16/637,870

(22) PCT Filed: Jul. 6, 2018

(86) PCT No.: PCT/CN2018/094795
§ 371 (c)(1),
(2) Date: Feb. 10, 2020

(87) PCT Pub. No.: WO2019/029302
PCT Pub. Date: Feb. 14, 2019

(65) Prior Publication Data
US 2020/0252912 A1 Aug. 6, 2020

(30) Foreign Application Priority Data

Aug. 10, 2017 (CN) .................. 201710680458.X

(51) Int. Cl.
*H04W 72/04* (2009.01)

(52) U.S. Cl.
CPC ..... *H04W 72/042* (2013.01); *H04W 72/0446* (2013.01)

(58) Field of Classification Search
CPC .................. H04W 72/042; H04W 72/0446
(Continued)

(56) References Cited

U.S. PATENT DOCUMENTS

2012/0113963 A1 5/2012 Liberg et al.
2016/0128089 A1 5/2016 Seo et al.
(Continued)

FOREIGN PATENT DOCUMENTS

CN 101562903 A 10/2009
CN 102625457 A 8/2012
(Continued)

OTHER PUBLICATIONS

UE behaviour related to dynamic and semi-static configured resources; RI-1710781; Qingdao, P.R. China Jun. 27-30, 2017; 3 pages.
(Continued)

*Primary Examiner* — Peter G Solinsky
(74) *Attorney, Agent, or Firm* — Price Heneveld LLP

(57) ABSTRACT

The present disclosure provides a slot monitoring method, an information transmission method, a user equipment and a network device. The slot monitoring method includes: monitoring UE group common PDCCH for a slot format indicator (SFI), and getting control information transmitted on the UE group common PDCCH. The SFI indicates to a UE slot formats of a number of consecutive N slots including a slot where the UE group common control information located, where N is positive integer.

17 Claims, 3 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0367289 A1* | 12/2018 | Kim | ...................... | H04L 5/0094 |
| 2018/0376476 A1* | 12/2018 | Lee | ...................... | H04L 5/0053 |
| 2019/0159191 A1* | 5/2019 | Kim | ...................... | H04W 72/14 |
| 2019/0349904 A1* | 11/2019 | Kwak | ................. | H04W 72/042 |
| 2020/0344034 A1* | 10/2020 | Moon | ................... | H04L 5/0092 |
| 2020/0344761 A1* | 10/2020 | Amuru | ................. | H04B 7/0452 |

FOREIGN PATENT DOCUMENTS

| | | |
|---|---|---|
| CN | 102752803 A | 10/2012 |
| CN | 105229952 A | 1/2016 |
| KR | 101483732 B1 | 1/2015 |

OTHER PUBLICATIONS

Discussion on UE behavior for group-common PDCCH for NR; R1-1711357; Qingdao, P.R. China, Jun. 27-30, 2017; 5 pages.
Nokia, Alcatel-Lucent Shanghai Bell, On the mini-slot design in NR, 3GPP TSG-RAN WG1#NR, Jan. 16-20, 2020, pp. 1-8, Spokane, USA.
Catt, Contents of the group-common PDCCH, 3GPP TSG RAN WG1 Meeting #89, May 15-19, 2017, pp. 1-4, Hangzhou, P.R. China.

* cited by examiner obtaining a slot format indicator (SFI) in UE group common control information. The SFI indicates the UE slot formats of a number of consecutive N slots including the slot where the UE group common control information located, where N is positive integer — 11 if the slot format indicator is not detected, monitoring in a predefined behavior, a number of slots right after the slot where the UE group common control information located — 12

FIG. 1

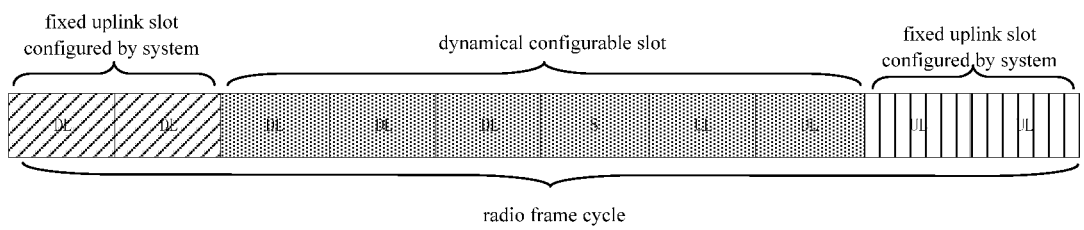

radio frame cycle

FIG. 2 obtaining a slot format indicator (SFI) in UE group common control information, where the SFI indicates UE slot formats of a number of consecutive N slots including the slot where the UE group common control information located, N is positive integer — 31 if the slot format indicator is not detected, monitoring multiple fixed downlink slots right after the slot where the UE group common control information located, where the multiple fixed downlink slots are pre-configured fixed downlink slots; and/or, monitoring at least one slot from multiple dynamical configurable slots right after the slot where the UE group common control information located, where the dynamical configurable slots are semi-statically configured flexible slots — 32 when downlink control information in one fixed downlink slot is detected, transmitting uplink data in a corresponding uplink slot according to UL-DL timing relationship indicated by the control information; or, when downlink control information in one dynamical configurable downlink slot is detected, transmitting uplink data in a corresponding uplink slot according to UL-DL timing relationship indicated by the control information — 33

FIG. 3

SLOT MONITORING METHOD, INFORMATION TRANSMISSION METHOD, USER EQUIPMENT AND NETWORK DEVICE

CROSS-REFERENCE TO RELATED APPLICATION

This application is the U.S. national phase of PCT Application PCT/CN2018/094795 filed on Jul. 6, 2018, which claims the benefit and priority of Chinese Application No. 201710680458.X, filed on Aug. 10, 2017, which is incorporated herein by reference in its entirety.

TECHNICAL FIELD

The present disclosure relates to the field of communication technologies, and in particular, to a slot monitoring method, an information transmission method, a user equipment and a network device.

BACKGROUND

In the Time Division Long Term Evolution (TD-LTE) communication system in the related art, a frame structure is semi-statically configured through system information. By reading the system information, a user equipment (UE) can obtain a specific uplink and downlink subframe (or slot) ratio in a radio frame, a subframe structure and retransmission timing relationship corresponding to the ratio.

The UE monitors in real time a control channel in a corresponding downlink subframe to determine whether there is scheduling information for the UE. The UE transmits uplink data or control information according to a specific timing relationship in a corresponding uplink subframe.

The 5G New Radio defines a new downlink control channel, i.e., UE group common control channel. The UE group common control channel can transmit control information to a group of UEs. The specific control information includes slot format indicator (SFI). This information may dynamically indicate structure types (including downlink slot, uplink slot, downlink self-contained slot, or an uplink self-contained slot) of multiple slots, where n is an integer greater than or equal to 1.

Meanwhile, the 5G New Radio (NR) has adopted a semi-static frame structure configuration, which semi-statically indicates a radio frame cycle by system information or other means.

Some slots in the cycle are fixed downlink slot structures, and some slots are fixed uplink slot structures. There are also some slots, although their specific slot structures have been configured semi-statically, their specific slot structures may be configured or changed by the UE group common control information.

For example, one slot is semi-statically configured as a flexible slot structure, but the UE group common control channel can dynamically indicate that the slot is an uplink self-contained slot structure through SFI.

Based on the above description, if the UE group common control channel cannot be correctly detected, there is no solution in the related art about how the UE should operate.

SUMMARY

The present disclosure provides a slot monitoring method, an information transmission method, a user equipment (UE) and a network device. When the UE group common control channel is not detected, for fixed slots and dynamical configurable slots, a method is provided for the UE to monitor slots, thereby avoiding the problem that the UE can not receive scheduling of a base station to the UE in subsequent slots due to waiting behavior of the UE.

An embodiment of the present disclosure provides a slot monitoring method, including: obtaining a slot format indicator (SFI) in UE group common control information; wherein the SFI indicates to a UE slot formats of a number of consecutive N slots including a slot where the UE group common control information located, where N is positive integer.

Optionally, the method further includes: if the slot format indicator is not detected, monitoring, in a predefined behavior, a number of slots right after the slot where the UE group common control information located.

Optionally, the step of monitoring, in a predefined behavior, a number of slots right after the slot where the UE group common control information located, includes: monitoring multiple fixed downlink slots right after the slot where the UE group common control information located, wherein the multiple fixed downlink slots are semi-statically configured downlink slots; and/or, monitoring at least one slot from multiple dynamical configurable slots right after the slot where the UE group common control information located, wherein the dynamical configurable slots are semi-statically configured flexible slots.

Optionally, after monitoring multiple fixed downlink slots right after the slot where the UE group common control information located, the method further includes: when downlink control information in one fixed downlink slot is detected, transmitting uplink data in a corresponding uplink slot according to UL-DL timing relationship indicated by the control information.

Optionally, after monitoring at least one slot from multiple dynamical configurable slots right after the slot where the UE group common control information located, the method further includes: when downlink control information in one dynamical configurable downlink slot is detected, transmitting uplink data in a corresponding uplink slot according to UL-DL timing relationship indicated by the control information.

Optionally, the method further includes: not monitoring the slot for transmitting uplink data.

An embodiment of the present disclosure provides a user equipment (UE) including: a transceiver, configured to obtain a slot format indicator (SFI) in UE group common control information; wherein the SFI indicates slot formats of a number of consecutive N slots including a slot where the UE group common control information located, where N is positive integer.

Optionally, the transceiver is further configured to, when the slot format indicator is not detected, monitor, in a predefined behavior, a number of slots right after the slot where the UE group common control information located.

Optionally, when the slots right after the slot where the UE group common control information located are monitored in the predefined behavior, the transceiver is specifically configured to, monitor multiple fixed downlink slots right after the slot where the UE group common control information located, wherein the multiple fixed downlink slots are semi-statically configured downlink slots; and/or, monitor at least one slot from multiple dynamical configurable slots right after the slot where the UE group common control information located, wherein the dynamical configurable slots are semi-statically configured flexible slots.

Optionally, after monitoring multiple fixed downlink slots right after the slot where the UE group common control information located, the transceiver is further configured to when downlink control information in one fixed downlink slot is detected, transmit uplink data in a corresponding uplink slot according to UL-DL timing relationship indicated by the control information.

Optionally, after monitoring at least one slot from multiple dynamical configurable slots right after the slot where the UE group common control information located, the transceiver is further configured to, when downlink control information in one dynamical configurable downlink slot is detected, transmit uplink data in a corresponding uplink slot according to UL-DL timing relationship indicated by the control information.

Optionally, the transceiver is further configured to, not monitor the slot for transmitting uplink data.

An embodiment of the present disclosure provides a user equipment (UE) including: a transceiver module, configured to obtain a slot format indicator (SFI) in UE group common control information; wherein the SFI indicates slot formats of a number of consecutive N slots including a slot where the UE group common control information located, where N is positive integer.

An embodiment of the present disclosure provides an information transmission method including: transmitting UE group common control information to a user equipment (UE); wherein the UE group common control information includes a slot format indicator (SFI) and the SFI indicates slot formats of a number of consecutive N slots including a slot where the UE group common control information located, N is positive integer.

Optionally, the method further includes: transmitting configuration information to the UE by high layer signaling; wherein the configuration information is used to enable the UE to monitor at least one slot from multiple slots right after the slot where the UE group common control information located, or not monitor multiple dynamical configurable slots right after the slot where UE group common control information located, and the dynamical configurable slots are semi-statically configured flexible slots.

Optionally, the method further includes: receiving uplink data transmitted by the UE in an uplink slot which is corresponding to the dynamical configurable downlink slot according to UL-DL timing relationship indicated by the control information.

An embodiment of the present disclosure provides a network device including: a transceiver configured to transmit UE group common control information to a user equipment (UE); wherein the UE group common control information includes a slot format indicator (SFI) and the SFI indicates slot formats of a number of consecutive N slots including a slot where the UE group common control information located, N is positive integer.

Optionally, the transceiver is further configured to transmit configuration information to the UE by high layer signaling; wherein the configuration information is used to enable the UE to monitor at least one slot from multiple dynamical configurable slots right after the slot where the UE group common control information located, or not monitor multiple dynamical configurable slots right after the slot where the UE group common control information located, and the dynamical configurable slots are semi-statically configured flexible slots.

Optionally, the transceiver is further configured to receive uplink data transmitted by the UE in an uplink slot which is corresponding to the dynamical configurable downlink slot according to UL-DL timing relationship indicated by the control information.

An embodiment of the present disclosure provides a network device including: a transceiver module configured to transmit UE group common control information to a user equipment (UE); wherein the UE group common control information includes a slot format indicator (SFI) and the SFI indicates slot formats of a number of consecutive N slots including a slot where the UE group common control information located, N is positive integer.

An embodiment of the present disclosure provides a communication device including: a processor and a memory storing a computer program; wherein when the computer program is executed by the processor, the processor performs the above slot monitoring method and/or the above information transmission method.

An embodiment of the present disclosure provides a computer readable storage medium including instructions; wherein the instructions are executed by a computer to enable the computer to perform the above slot monitoring method and/or the above information transmission method.

BRIEF DESCRIPTION OF THE DRAWINGS

FIG. 1 is a first flowchart of a slot monitoring method according to an embodiment of the present disclosure;

FIG. 2 is a schematic diagram of a radio frame cycle according to an embodiment of the present disclosure;

FIG. 3 is a second flowchart of a slot monitoring method according to an embodiment of the present disclosure;

DETAILED DESCRIPTION

Figure 4:
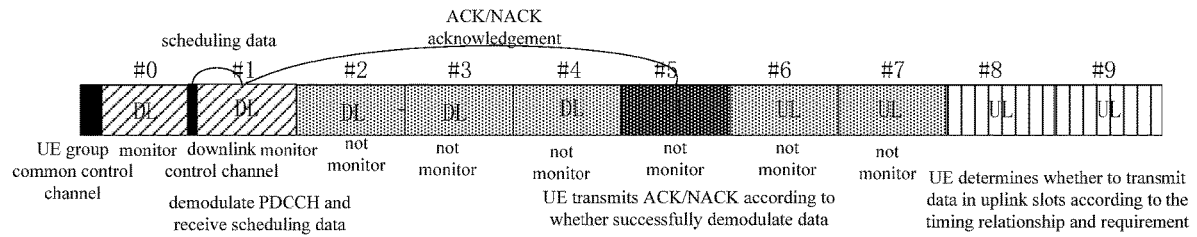
FIG. 4 is a schematic diagram showing that UE does not monitor a dynamical configurable slot according to an embodiment of the present disclosure.

Exemplary embodiments of the present disclosure will be described hereinafter in details with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided to enable a thorough understanding of the present disclosure, and to fully convey the scope of the present disclosure to those skilled in the art.

As shown in FIG. 1, one embodiment of the present disclosure provides a slot monitoring method, including:

Step 11: obtaining a slot format indicator (SFI) in UE group common control information. The SFI indicates the UE slot formats of a number of consecutive N slots including the slot where the UE group common control information located, where N is positive integer.

In some optional embodiments, the method further includes: Step 12, if the slot format indicator is not detected, monitoring in a predefined behavior, a number of slots right after the slot where the UE group common control information located.

Specifically, a base station semi-statically configures a radio frame cycle by system information or other manners. One cycle includes N consecutive slots. Among the N slots, the number of slots which are fixed downlink structure, is a; the number of slots which are fixed uplink structure, is b; structure types of (N-a-b) slots can be configured through a UE group common control channel; where a, b and n are integers greater than or equal to 0, and (a+b) is less than or equal to N.

As shown in FIG. 2, an UL-DL subframe configuration is specifically DDDDDSUUUU, where D represents a downlink slot structure, U represents an uplink slot structure, and S represents a self-contained or special slot structure.

Specifically, in one frame cycle, first two slots may be configured as fixed downlink slots, last two slots may be configured as fixed uplink slots. The UE group common control channel occupies, but not limited to, one or two orthogonal frequency division multiplexing (OFDM) symbols in the first fixed downlink slot.

The consecutive N slots include: a downlink slot, an uplink slot, a downlink self-contained slot, or an uplink self-contained slot.

In the above embodiment of the present disclosure, by monitoring the slot where the UE group common control channel located, the slot format indicator of the control information transmitted on the UE group common control channel is obtained. If the control information is not demodulated, a number of slots right after the slot where the UE group common control information located, are monitored in the predefined behavior. Thus, when the UE group common control channel is not detected, the UE can still perform monitoring in the predefined behavior, thereby avoiding the problem that the UE can not receive scheduling of the base station to the UE in subsequent slots due to waiting behavior of the UE.

As shown in FIG. 3, one embodiment of the present disclosure provides a slot monitoring method, including:

Step 31: obtaining a slot format indicator (SFI) in UE group common control information, where the SFI indicates UE slot formats of a number of consecutive N slots including the slot where the UE group common control information located, N is positive integer;

Step 32: if the slot format indicator is not detected, monitoring multiple fixed downlink slots right after the slot where the UE group common control information located, where the multiple fixed downlink slots are pre-configured fixed downlink slots; and/or, monitoring at least one slot from multiple dynamical configurable slots right after the slot where the UE group common control information located, where the dynamical configurable slots are semi-statically configured flexible slots;

Step 33: when downlink control information in one fixed downlink slot is detected, transmitting uplink data in a corresponding uplink slot according to UL-DL timing relationship indicated by the control information; or, when downlink control information in one dynamical configurable downlink slot is detected, transmitting uplink data in a corresponding uplink slot according to UL-DL timing relationship indicated by the control information. In the step 33, the uplink slot for transmitting uplink data may not be monitored.

Specifically, according to configuration of high layer signaling (such as RRC signaling or other manner), at least one slot from multiple dynamical configurable slots right after the slot where the UE group common control information located may be monitored, or the multiple dynamical configurable slots right after the slot where the UE group common control information located may be not monitored.

As shown in FIG. 4, the UE group common control channel is located in the fixed downlink slot #0, and indicates frame structures of consecutive 10 slots (indicating structures of the fixed slots being the same as the semi-static configuration).

However, in this embodiment, the network side configures the UE to not monitor the dynamical configurable slots, and the specific process includes the following steps:

at step 41, the network side semi-statically configures the UE to not monitor intermediate dynamical configurable slots or configures the UE to monitor intermediate dynamical configurable slots, through RRC signaling;

at step 42, the network side notifies structures of subsequent dynamical configurable slots through the UE group common control channel;

at step 43, the UE does not detect the UE group common control channel;

at step 44, the UE monitors the first two fixed downlink slots, detects downlink control information in the slot #1, and correctly demodulates received data; the downlink control information indicates that ACK/NACK is transmitted in the slot #5;

at step 45, the UE does not monitor intermediate dynamical configurable slots (including slot #2, slot #3, slot #4, slot #5, slot #6 and slot #7);

at step 46, the UE transmits ACK/NACK in the slot #5 according to dynamic indication, and the UE does not monitor the slot #5;

at step 47, the UE determines whether to transmit data in uplink slots #8 and #9 according to the timing relationship and requirement. The uplink slots #8 and #9 are fixed uplink slots configured by the system, and are not monitored.

Figure 5:
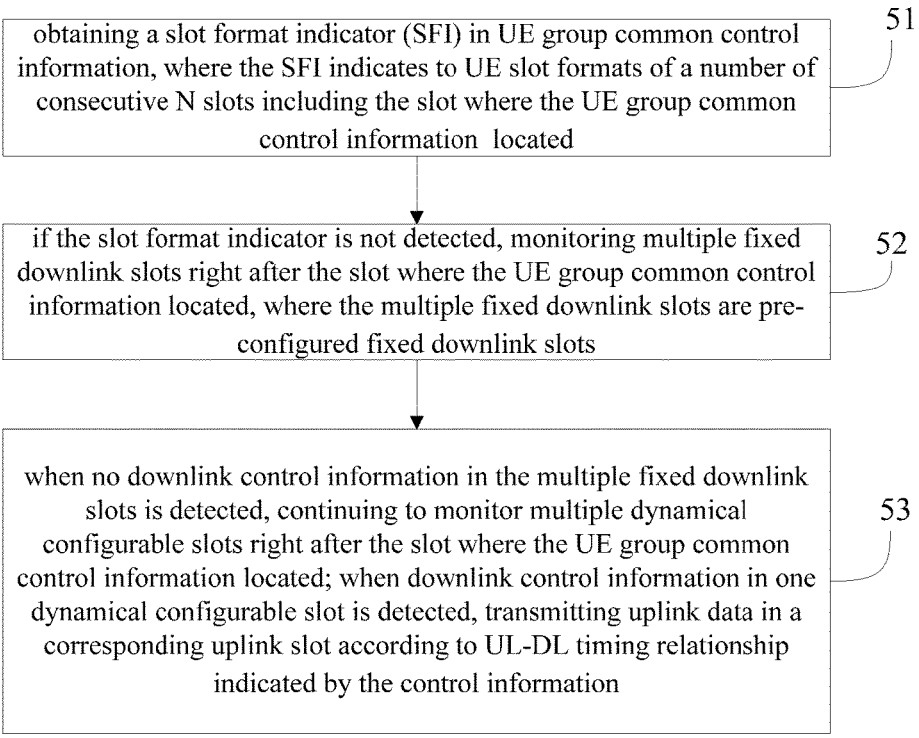
FIG. 5 is a third flowchart of a slot monitoring method according to an embodiment of the present disclosure.

As shown in FIG. 5, one embodiment of the present disclosure provides a slot monitoring method, including:

Step 51: obtaining a slot format indicator (SFI) in UE group common control information, where the SFI indicates to UE slot formats of a number of consecutive N slots including the slot where the UE group common control information located;

Step 52: if the slot format indicator is not detected, monitoring multiple fixed downlink slots right after the slot where the UE group common control information located, where the multiple fixed downlink slots are pre-configured fixed downlink slots;

Step 53: when no downlink control information in the multiple fixed downlink slots is detected, continuing to monitor multiple dynamical configurable slots right after the slot where the UE group common control information located; when downlink control information in one dynamical configurable slot is detected, transmitting uplink data in a corresponding uplink slot according to UL-DL timing relationship indicated by the control information.

In addition, in this embodiment, the uplink slot for transmitting uplink data is not monitored.

The UE group common control information refers to control information transmitted on the UE group common control channel. Monitoring multiple dynamical configurable slots right after the slot where the UE group common control information located includes: monitoring dynamical configurable downlink slots and dynamical configurable uplink slots right after the slot where the UE group common control information located.

Figure 6:
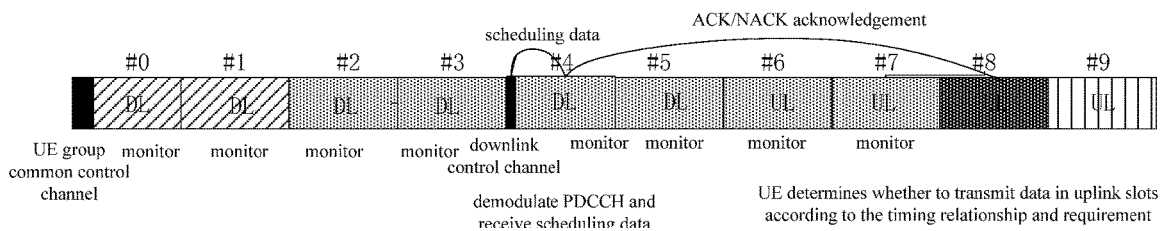
FIG. 6 is a schematic diagram showing that UE monitors a dynamical configurable slot according to an embodiment of the present disclosure.

Specifically, as shown in FIG. 6, the UE group common control channel occupies first two OFDM symbols of the first slot, and indicates frame structures of consecutive 10 slots (indicating structure of the fixed slots being the same as the semi-static configuration). The specific process is as follows:

at step 61, the network side semi-statically configures the UE to monitor intermediate dynamical configurable slots through RRC signaling; of course, the UE may monitor intermediate dynamical configurable slots according to pre-agreement instead of configuration by high-level signaling;

at step 62, the network side notifies structures of subsequent dynamic slots through the UE group common control channel;

at step 63, the UE does notdemodulate the UE group common control channel;

at step 64, the UE monitors the first two fixed downlink slots (slots #0 and #1) pre-configured by the system; optionally, the first two fixed downlink slots are pre-configured by the network side in a semi-static manner, such as the fixed downlink slots #0 and #1 in the figure;

at step 65, the UE continues to monitor dynamic slots #2 and #3 which are intermediate dynamical configurable slots, and no control information is detected;

at step 66, the UE detects downlink control information in the intermediate dynamic slot #4, and correctly demodulates received data;

at step 67, according to timing relationship in the control information, the UE determines that ACK information is transmitted in the slot #8;

at step 68, the UE continues to monitor the dynamic slots #5, #6 and #7, and no control information is detected;

at step 69, the UE transmits an ACK acknowledgement message in the fixed uplink slot #8;

at step 70, the UE determines whether to transmit data in uplink slot #9 according to the timing relationship and requirement.

Figure 7:
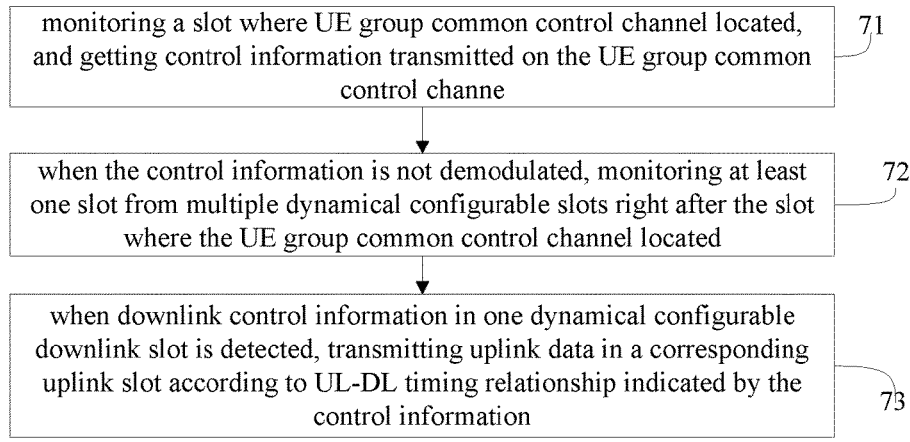
FIG. 7 is a fourth flowchart of a slot monitoring method according to an embodiment of the present disclosure.

As shown in FIG. 7, one embodiment of the present disclosure further provides a slot monitoring method, including:

Step 71: monitoring a slot where UE group common control channel located, and getting control information transmitted on the UE group common control channel;

Step 72: when the control information is not demodulated, monitoring at least one slot from multiple dynamical configurable slots right after the slot where the UE group common control channel located;

specifically, according to configuration of high layer signaling (such as RRC signaling or other manner), at least one of multiple dynamical configurable slots right after the slot where the UE group common control information located may be monitored, or the multiple dynamical configurable slots right after the slot where the UE group common control information located may be not monitored;

Step 73: when downlink control information in one dynamical configurable downlink slot is detected, transmitting uplink data in a corresponding uplink slot according to UL-DL timing relationship indicated by the control information.

In this embodiment, the uplink slot for transmitting uplink data is not monitored.

Monitoring multiple dynamical configurable slots right after the slot where the UE group common control channel located includes: monitoring dynamical configurable downlink slots and dynamical configurable uplink slots right after the slot where the UE group common control channel located.

Figure 8:
FIG. 8 is a schematic diagram showing that all slots in a radio frame are dynamical configurable according to an embodiment of the present disclosure.

As shown in FIG. 8, a base station semi-statically configures a 5 ms period by system information or other methods, subcarrier spacing is 30 kHz, one slot contains 14 OFDM symbols, and the 5 ms period has 10 slots. Specifically, no OFDM symbol is a fixed downlink slot or a fixed uplink slot, and all slots are dynamically configured through UE group common control channel.

The UE group common control information is in the first slot, and indicates frame structures of consecutive 10 slots. In this embodiment, the network side configures the UE to monitor the dynamical configurable slots.

Figure 9:
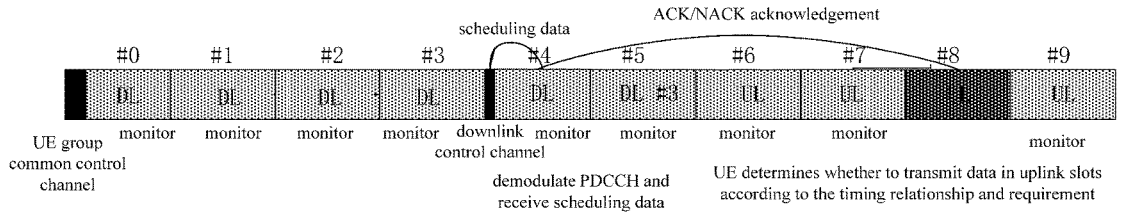
FIG. 9 is a schematic diagram showing that UE monitors dynamical configurable slots based on a frame structure shown in FIG. 8 according to an embodiment of the present disclosure.

As shown in FIG. 9, the specific process is as follows.

at step 91, the network side semi-statically configures the UE to monitor intermediate dynamical slots through RRC signaling;

at step 92, the network side notifies structures of subsequent dynamic slots through the UE group common control channel;

at step 93, the UE does not demodulate the UE group common control channel;

at step 94, the UE continues to monitor intermediate dynamical slots #0, #1, #2 and #3, and no control information is detected;

at step 95, the UE detects downlink control information in the intermediate dynamic slot #4, and correctly demodulates received data; the downlink control information indicates that ACK/NACK is transmitted in the slot #8;

at step 96, the UE continues to monitor the intermediate dynamic slots #5, #6 and #7, and no control information is detected;

at step 97, the UE transmits an ACK acknowledgement message in the intermediate slot #8 and does not perform monitoring;

at step 98, the UE continues to monitor the dynamic slot #9, and no control information is detected.

In the foregoing embodiment of the present disclosure, when the slot format indicator (SFI) in the UE group common control channel is not demodulated, the operations of the UE include:

(a) continuing to monitor fixed downlink slots; according to timing relationship, transmitting data or control information in fixed uplink slots;

(b) by RRC signaling or other manners, configuring the UE whether to monitor dynamical configurable slots, and a specific configuration manner;

(c) when the UE needs to monitor one dynamical configurable slot and the UE simultaneously receives an indication for transmitting uplink data or control information in the slot, the UE transmits uplink data or control information in the slot and does not monitor the control channel.

Then, when the UE group common control channel is not demodulated, the UE can still operate according to pre-defined rules, thereby avoiding the problem that the UE can not receive scheduling of the base station to the UE in subsequent slots due to simple waiting behavior of the UE.

One embodiment of the present disclosure further provides a user equipment (UE), including:

a transceiver, used to obtain a slot format indicator (SFI) in UE group common control information. The SFI indicates slot formats of a number of consecutive N slots including the slot where the UE group common control information located, where N is positive integer.

Optionally, the transceiver is further used to, when the slot format indicator is not detected, monitor in a predefined behavior, a number of slots right after the slot where the UE group common control information located.

Optionally, the transceiver is specifically configured to, monitor multiple fixed downlink slots right after the slot where the UE group common control information located, where the multiple fixed downlink slots are semi-statically configured fixed downlink slots; and/or, monitor at least one slot from multiple dynamical configurable slots right after the slot where the UE group common control information is located, where the dynamical configurable slots are semi-statically configured flexible slots.

Optionally, the transceiver is specifically configured to, when downlink control information in one fixed downlink slot is detected, transmit uplink data in a corresponding uplink slot according to UL-DL timing relationship indicated by the control information.

Optionally, the transceiver is specifically configured to, not monitor multiple dynamical configurable slots right after the slot where the UE group common control channel located.

Optionally, the transceiver is specifically configured to, when no downlink control information in the multiple fixed downlink slots is detected, continue to monitor multiple dynamical configurable slots right after the slot in which the UE group common control channel is located;

when downlink control information in one dynamical configurable slot is detected, transmit uplink data in a corresponding uplink slot according to UL-DL timing relationship indicated by the control information.

Optionally, monitoring multiple dynamical configurable slots right after the slot where the UE group common control channel located includes: monitoring dynamical configurable downlink slots and dynamical configurable uplink slots right after the slot where the UE group common control channel located.

Optionally, the transceiver is specifically configured to, according to configuration of high layer signaling, monitor at least one slot from multiple dynamical configurable slots right after the slot where the UE group common control channel located, or not monitor the multiple dynamical configurable slots right after the slot where the UE group common control channel located.

Optionally, when the transceiver monitors at least one slot from multiple dynamical configurable slots right after the slot where the UE group common control channel located, the transceiver is further configured to, when downlink control information in one dynamical configurable downlink slot is detected, transmit uplink data in a corresponding uplink slot according to UL-DL timing relationship indicated by the control information.

Optionally, the transceiver is further configured to, not monitor the uplink slot for transmitting uplink data.

It should be noted that this UE embodiment refers to a UE corresponding to the foregoing method embodiment, and all the implementation manners in the foregoing method embodiment are applicable to the UE embodiment, and the same technical effects can be achieved.

One embodiment of the present disclosure further provides a UE, including: a transceiver module used to obtain a slot format indicator (SFI) in UE group common control information, where the SFI indicates slot formats of a number of consecutive N slots including the slot where the UE group common control information located, N is positive integer.

This UE embodiment refers to a UE corresponding to the foregoing method embodiment, and all the implementation manners in the foregoing method embodiment are applicable to the UE embodiment, and the same technical effects can be achieved.

One embodiment of the present disclosure further provides an information transmission method, including:

transmitting UE group common control information to a UE; where the UE group common control information includes a slot format indicator (SFI) and the SFI indicates to UE slot formats of a number of consecutive N slots including the slot where the UE group common control information located, N is positive integer.

Optionally, the information transmission method further includes:

transmitting configuration information to the UE by high layer signaling, where the configuration information is used to enable the UE to monitor at least one slot of multiple dynamical configurable slots right after the slot where the UE group common control information located, or not monitor multiple dynamical configurable slots right after the slot where the UE group common control information located, where the dynamical configurable slots are semi-statically configured flexible slots.

Optionally, the information transmission method further includes:

receiving uplink data, which is transmitted by the UE in an uplink slot, where the uplink slot is corresponding to the dynamical configurable downlink slot according to UL-DL timing relationship indicated by the control information.

One embodiment of the present disclosure further provides a network device, including:

a transceiver used to transmit UE group common control information to a UE; where the UE group common control information includes a slot format indicator (SFI) and the SFI indicates slot formats of a number of consecutive N slots including the slot where the UE group common control information located, N is positive integer.

Optionally, the transceiver is further configured to transmit configuration information to the UE by high layer signaling, where the configuration information is used to enable the UE to monitor at least one slot from multiple dynamical configurable slots right after the slot where the UE group common control information located, or not monitor multiple dynamical configurable slots right after the slot where the UE group common control information located, where the dynamical configurable slots are semi-statically configured flexible slots.

Optionally, the transceiver is further used to receive uplink data, which is transmitted by the UE in an uplink slot which is corresponding to the dynamical configurable downlink slot according to UL-DL timing relationship indicated by the control information.

One embodiment of the present disclosure further provides a network device, including:

a transceiver module used to transmit UE group common control information to a UE; where the UE group common control information includes a slot format indicator (SFI) and the SFI indicates slot formats of a number of consecutive N slots including the slot where the UE group common control information located, N is positive integer.

One embodiment of the present disclosure further provides a communication device including: a processor, and a memory storing a computer program. When the computer program is executed by the processor, the processor performs the method as described above. The communication device may be a UE for the above method shown in FIG. 1 to FIG. 9, or may be a network device that performs the above information transmission method.

One embodiment of the present disclosure further provides a computer readable storage medium including instructions. The instructions are executed by a computer to enable the computer to perform the method as described above.

In the foregoing embodiment of the present disclosure, when the slot format indicator (SFI) in the UE group common control channel is not demodulated, the operations of the UE include:

(A) continuing to monitor fixed downlink slots; according to timing relationship, transmitting data or control information in fixed uplink slots;

(B) by RRC signaling or other manners, configuring the UE whether to monitor dynamical configurable slots, and a specific configuration manner;

(C) when the UE needs to monitor one dynamical configurable slot and the UE simultaneously receives an indication for transmitting uplink data or control information in the slot, the UE transmits uplink data or control information in the slot and does not monitor the control channel.

Then, when the UE group common control channel is not demodulated, the UE can still operate according to predefined rules, thereby avoiding the problem that the UE can not receive scheduling of the base station to the UE in subsequent slots due to simple waiting behavior of the UE.

The above are optional embodiments of the present disclosure. It should be noted that those skilled in the art may make several improvements and modifications without departing from the principles of the present disclosure and these improvements and modifications are covered by the protection scope of the present disclosure.

What is claimed is:

1. A slot monitoring method comprising:
monitoring UE group common PDCCH for a slot format indicator (SFI), and getting control information transmitted on the UE group common PDCCH;
wherein the SFI indicates to a UE slot formats of a number of consecutive N slots including a slot where the UE group common control information located, where N is positive integer;
wherein the method further comprises:
responsive to the slot format indicator is not detected, monitoring PDCCH of, in a predefined behavior, a number of slots right after the slot where the UE group common control information located.

2. The method according to claim 1, wherein the step of monitoring PDCCH of, in a predefined behavior, a number of slots right after the slot where the UE group common control information located, comprises:
monitoring the PDCCH of multiple semi-statically configured downlink slots right after the slot where the UE group common control information located; and/or,
monitoring the PDCCH of at least one slot from multiple semi-statically configured flexible slots right after the slot where the UE group common control information located.

3. The method according to claim 2, wherein after monitoring the PDCCH of multiple semi-statically configured downlink slots right after the slot where the UE group common control information located, the method further comprises:

when downlink control information in one semi-statically configured downlink slot is detected, transmitting uplink data in a corresponding uplink slot according to UL-DL timing relationship indicated by the control information.

4. The method according to claim 3, further comprising: not monitoring the slot for transmitting uplink data.

5. The method according to claim 2, wherein after monitoring the PDCCH of at least one slot from multiple semi-statically configured flexible slots right after the slot where the UE group common control information located, the method further comprises:
when downlink control information in one dynamical configurable downlink slot is detected, transmitting uplink data in a corresponding uplink slot according to UL-DL timing relationship indicated by the control information.

6. The method according to claim 5, further comprising: not monitoring the slot for transmitting uplink data.

7. A user equipment (UE) comprising:
a transceiver, configured to monitor UE group common PDCCH for a slot format indicator (SFI), and get control information transmitted on the UE group common PDCCH; wherein the SFI indicates slot formats of a number of consecutive N slots including a slot where the UE group common control information located, where N is positive integer;
wherein the transceiver is further configured to, responsive to the slot format indicator is not detected, monitor PDCCH of, in a predefined behavior, a number of slots right after the slot where the UE group common control information located.

8. The UE according to claim 7, wherein when the PDCCH of the slots right after the slot where the UE group common control information located are monitored in the predefined behavior, the transceiver is specifically configured to,
monitor the PDCCH of multiple semi-statically configured downlink slots right after the slot where the UE group common control information located; and/or,
monitor the PDCCH of at least one slot from multiple semi-statically configured flexible slots right after the slot where the UE group common control information located.

9. The UE according to claim 8, wherein after monitoring the PDCCH of multiple semi-statically configured downlink slots right after the slot where the UE group common control information located, the transceiver is further configured to,
when downlink control information in one semi-statically configured downlink slot is detected, transmit uplink data in a corresponding uplink slot according to UL-DL timing relationship indicated by the control information.

10. The UE according to claim 9, wherein the transceiver is further configured to, not monitor the slot for transmitting uplink data.

11. The UE according to claim 8, wherein after monitoring the PDCCH of at least one slot from multiple semi-statically configured flexible slots right after the slot where the UE group common control information located, the transceiver is further configured to,
when downlink control information in one dynamical configurable downlink slot is detected, transmit uplink data in a corresponding uplink slot according to UL-DL timing relationship indicated by the control information.

12. The UE according to claim 11, wherein the transceiver is further configured to, not monitor the slot for transmitting uplink data.

13. An information transmission method comprising:
transmitting UE group common control information to a user equipment (UE); wherein the UE group common control information comprises a slot format indicator (SFI) and the SFI indicates slot formats of a number of consecutive N slots including a slot where the UE group common control information located, N is positive integer;
wherein the method further comprises:
transmitting configuration information to the UE by high layer signaling; wherein the configuration information is used to enable the UE to monitor PDCCH of at least one slot from multiple semi-statically configured flexible slots right after the slot where the UE group common control information located, or not monitor multiple semi-statically configured flexible slots right after the slot where UE group common control information located.

14. The method according to claim 13, further comprising:
receiving uplink data transmitted by the UE in an uplink slot which is corresponding to the dynamical configurable downlink slot according to UL-DL timing relationship indicated by the control information.

15. A network device for performing the information transmission method according to claim 13 comprising:
a transceiver configured to transmit UE group common control information to a user equipment (UE); wherein the UE group common control information comprises a slot format indicator (SFI) and the SFI indicates slot formats of a number of consecutive N slots including a slot where the UE group common control information located, N is positive integer.

16. The network device according to claim 15, wherein the transceiver is further configured to transmit configuration information to the UE by high layer signaling; wherein the configuration information is used to enable the UE to monitor PDCCH of at least one slot from multiple semi-statically configured flexible slots right after the slot where the UE group common control information located, or not monitor multiple semi-statically configured flexible slots right after the slot where the UE group common control information located.

17. The network device according to claim 15, wherein the transceiver is further configured to receive uplink data transmitted by the UE in an uplink slot which is corresponding to the dynamical configurable downlink slot according to UL-DL timing relationship indicated by the control information.

* * * * *